(12) United States Patent
Fujikawa et al.

(10) Patent No.: US 11,293,573 B2
(45) Date of Patent: Apr. 5, 2022

(54) PIPE UNIT COUPLING STRUCTURE

(71) Applicants: Masayuki Fujikawa, Toyota (JP); SEKISO CORPORATION, Okazaki (JP)

(72) Inventors: Masayuki Fujikawa, Toyota (JP); Kazuya Tono, Okazaki (JP)

(73) Assignees: TOYOTA JIDOSHA KABUSHIKI KAISHA, Toyota (JP); SEKISO CORPORATION, Okazaki (JP)

(*) Notice: Subject to any disclaimer, the term of this patent is extended or adjusted under 35 U.S.C. 154(b) by 790 days.

(21) Appl. No.: 16/159,032

(22) Filed: Oct. 12, 2018

(65) Prior Publication Data

US 2019/0113164 A1 Apr. 18, 2019

(30) Foreign Application Priority Data

Oct. 12, 2017 (JP) .............................. JP2017-198483

(51) Int. Cl.
| | |
|---|---|
| *B24D 13/00* | (2006.01) |
| *F16L 37/08* | (2006.01) |
| *B60H 1/00* | (2006.01) |
| *F02M 35/16* | (2006.01) |
| *F02M 35/14* | (2006.01) |
| *F16L 5/10* | (2006.01) |

(Continued)

(52) U.S. Cl.
CPC .......... *F16L 37/08* (2013.01); *B60H 1/00564* (2013.01); *F02M 35/14* (2013.01); *F02M 35/16* (2013.01); *F16L 5/10* (2013.01); *F16L 37/008* (2013.01); *F16L 37/60* (2013.01)

(58) Field of Classification Search
CPC . F16L 37/144; F16L 37/0885; F16L 37/1225; F02M 35/10144
USPC ............................................................ 454/69
See application file for complete search history.

(56) References Cited

U.S. PATENT DOCUMENTS

| | | | | |
|---|---|---|---|---|
| 3,076,667 A | * | 2/1963 | Klingler ................ | F16L 17/073 285/98 |
| 6,279,964 B1 | * | 8/2001 | Watts .................... | F16L 23/032 285/179 |

(Continued)

FOREIGN PATENT DOCUMENTS

| | | |
|---|---|---|
| CN | 1614223 A | 5/2005 |
| CN | 201486701 U | 5/2010 |

(Continued)

*Primary Examiner* — Long T Tran
*Assistant Examiner* — James J Kim
(74) *Attorney, Agent, or Firm* — Oliff PLC (57) ABSTRACT

A pipe unit coupling structure includes a first member in which a first hole is formed, a second member including a pipe unit which is coupled to the first member by being inserted into the first hole, and a third member coupled to the second member by a coupling unit. The second member has an inclined surface formed at a tip of the pipe unit. The inclined surface is configured in such a manner that, when the inclined surface is pressed against the first member when the pipe unit of the second member is inserted into the first hole of the first member in a state where the second member and the third member are coupled to each other, a force is applied from the second member to the third member at the coupling unit, in a direction opposite to a direction of separation of the second member.

2 Claims, 7 Drawing Sheets

(51) Int. Cl.
*F16L 37/00* (2006.01)
*F16L 37/60* (2006.01)

(56) References Cited

U.S. PATENT DOCUMENTS

| | | | | |
|---|---|---|---|---|
| 7,438,328 | B2* | 10/2008 | Mori | F16L 37/0885 |
| | | | | 285/305 |
| 7,874,596 | B2* | 1/2011 | Kertesz | F16L 37/0985 |
| | | | | 285/417 |
| 9,745,926 | B2* | 8/2017 | Proettel | F02M 35/10209 |
| 2002/0071718 | A1* | 6/2002 | Marty | F16L 37/1225 |
| | | | | 403/293 |
| 2004/0021335 | A1* | 2/2004 | Schmid | B60S 1/0444 |
| | | | | 296/96.15 |
| 2005/0098159 | A1 | 5/2005 | Nishiwaki | |
| 2014/0326223 | A1 | 11/2014 | Proettel et al. | |
| 2015/0183149 | A1* | 7/2015 | Chow | B29C 31/04 |
| | | | | 425/200 |
| 2017/0211528 | A1* | 7/2017 | Nola | F02M 35/10321 |

FOREIGN PATENT DOCUMENTS

| | | |
|---|---|---|
| JP | 2003-148668 A | 5/2003 |
| JP | 2005-069341 A | 3/2005 |
| JP | 2008-008389 A | 1/2008 |
| JP | 2009-203901 A | 9/2009 |
| JP | 2012-127480 A | 7/2012 |

* cited by examiner

PIPE UNIT COUPLING STRUCTURE

CROSS REFERENCE TO RELATED APPLICATION

The entire disclosure of Japanese Patent Application No. 2017-198483 filed on Oct. 12, 2017, including the specification, claims, drawings, and abstract, is incorporated herein by reference in its entirety.

TECHNICAL FIELD

The present disclosure relates to a pipe unit coupling structure which comprises a first member, a second member including a pipe unit coupled to the first member, and a third member which is coupled to the second member.

BACKGROUND

JP 2009-203901 A discloses a structure in which a resonator is coupled to an intake duct by an attachment unit of the resonator being inserted into a hole on a branching section formed on the intake duct. The intake duct corresponds to a first member. The resonator corresponds to a second member, and the attachment unit of the resonator corresponds to a pipe unit.

In the structure disclosed in JP 2009-203901 A, when the attachment unit of the resonator is inserted into the hole of the branching section of the intake duct, a nearby portion which is near the hole of the branching section may be pressed against a tip on the insertion side of the attachment unit of the resonator, and a load may be applied to the tip. Based on the load, at a coupling unit of the resonator, to which a third member which is another member is coupled, a force in a direction to separate the resonator from the third member would be applied, resulting in a possibility of separation of the resonator and the third member. Even when the first member is not the intake duct and the second member is not the resonator, unlike the above-described case, in a structure in which the pipe unit of the second member is inserted into the hole of the first member and the third member is coupled to the second member, there is a possibility that a disadvantage similar to that described above may occur.

An advantage of the present disclosure lies in provision of a pipe unit coupling structure in which, in a structure where the pipe unit of the second member is inserted into the hole of the first member and the third member is coupled to the second member, separation between the second member and the third member when the pipe unit is inserted into the hole can be suppressed.

SUMMARY

According to one aspect of the present disclosure, there is provided a pipe unit coupling structure comprising: a first member in which a first hole is formed; a second member including a pipe unit which is coupled to the first member by being inserted into the first hole; and a third member coupled to the second member by a coupling unit, wherein the second member has an inclined surface formed at a tip of the pipe unit on an insertion side, and the inclined surface is configured in such a manner that, when the inclined surface is pressed against the first member when the pipe unit of the second member is inserted into the first hole of the first member in a state where the second member and the third member are coupled to each other, a force is applied from the second member to the third member at the coupling unit, in a direction opposite to a direction of separation of the second member, by a load applied from the first member to the inclined surface.

In the above-described structure, when the pipe unit of the second member is inserted into the first hole of the first member in a state where the second member and the third member are coupled to each other, a nearby portion of the first hole of the first member may be pressed against the inclined surface of the second member and a load may be applied from the nearby portion. In this case, based on the load, a force is applied from the second member to the third member at the coupling unit between the second member and the third member, in a direction opposite to the direction to separate the second member, and thus, separation of the second member and the third member can be suppressed.

According to another aspect of the present disclosure, in the pipe unit coupling structure, a grommet made of a resin or a rubber may be attached to an attachment hole formed on one of the second member and the third member, and the coupling unit may be formed by coupling a pin-shaped protrusion formed on the other of the second member and the third member, and the grommet.

According to the structure described above, compared to a case where the coupling unit is formed by fastening a metal bolt and a metal nut, a weight of the coupling unit can be reduced, and the separation of the second member and the third member during insertion of the pipe unit of the second member into the first hole of the first member can be suppressed.

According to the pipe unit coupling structure of the present disclosure, in a structure in which the pipe unit of the second member is inserted into the hole of the first member and the third member is coupled to the second member, the separation of the second member and the third member when the pipe unit is inserted into the hole can be suppressed.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings. A shape, a material, and a number described below are exemplary for the purpose of explanation, and may be suitably changed according to a specification of the vehicle including the pipe unit coupling structure or the like. In the following, similar elements in the drawings are assigned the same reference numerals and described. In addition, in the following description, reference numerals which are previously described will be used as necessary.

Figure 1:
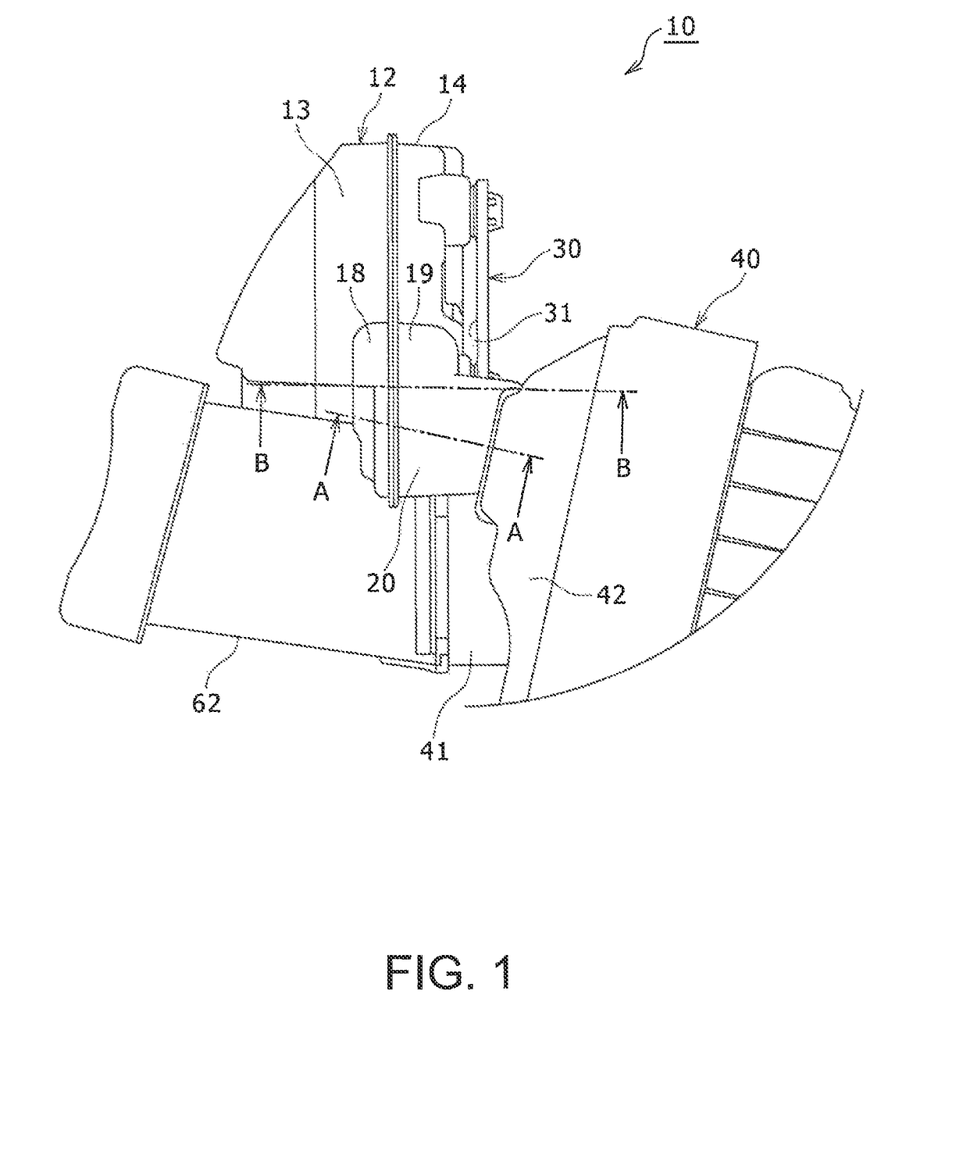
FIG. 1 is a diagram of a pipe unit coupling structure according to an embodiment of the present disclosure, viewed from above a vehicle.
Figure 2A:
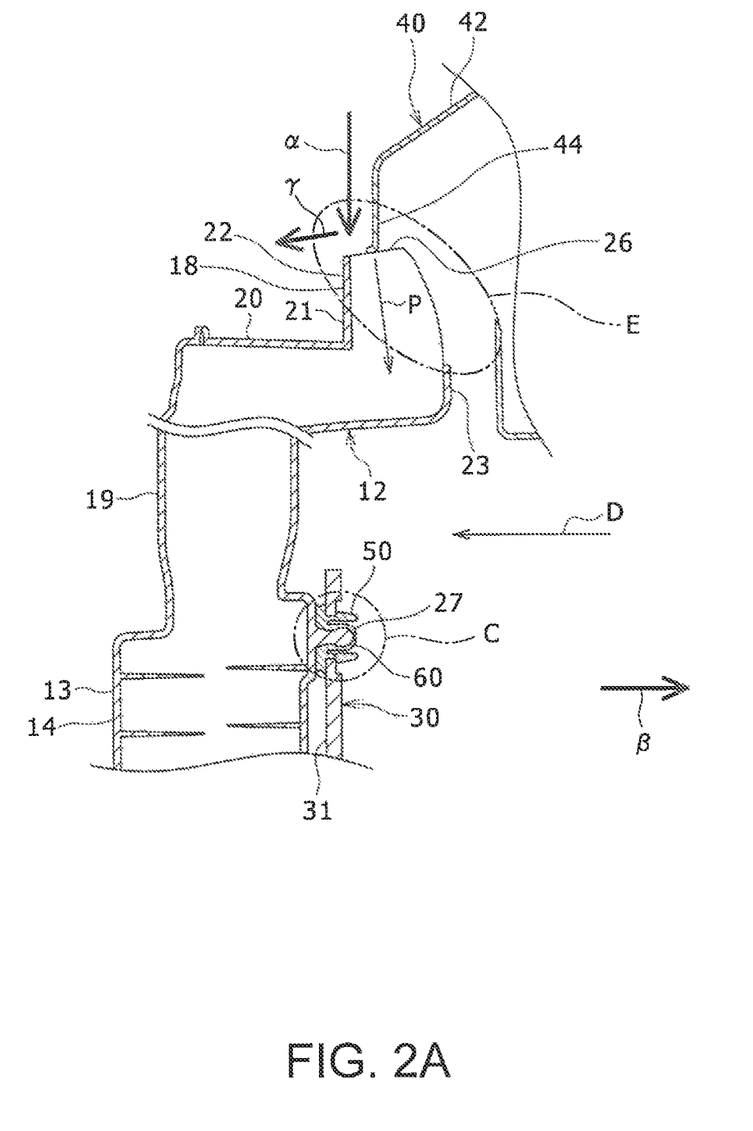
FIG. 2A is a diagram showing a state in which an end of a first member is pressed against an inclined surface when a pipe unit of a second member is inserted into a first hole of a first member in a state where the second member and a third member are coupled to each other, wherein an upper half corresponds to an A-A cross section of FIG. 1 and a lower half corresponds to a B-B cross section of FIG. 1.
Figure 2B:
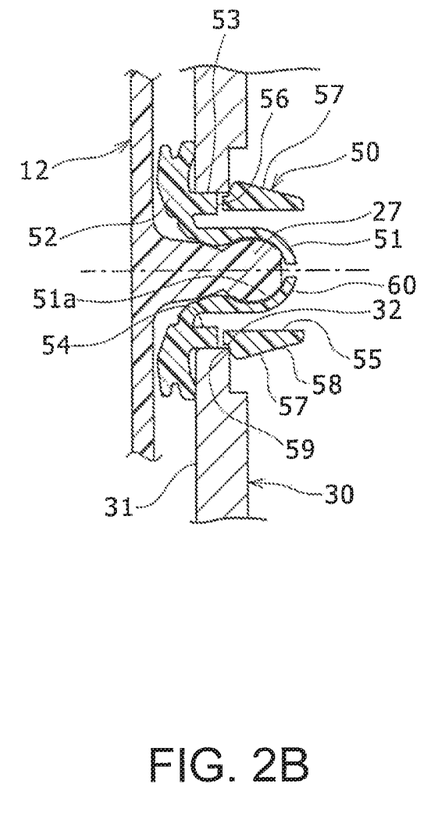
FIG. 2B is an enlarged view of a C part of FIG. 2A, showing a coupling unit between the second member and the third member.

FIG. 1 is a diagram of a pipe unit coupling structure 10 according to an embodiment of the present disclosure, viewed from above a vehicle. FIG. 2A is a diagram showing a state where an end of an air cleaner 40, which is a first member, is pressed against an inclined surface 26 when a pipe unit 18 of a resonator 12, which is a second member, is inserted into a first hole 44 of the air cleaner 40 in a state where the resonator 12 and a fixation member 30, which is a third member, are coupled to each other. An upper half of FIG. 2A corresponds to an A-A cross section of FIG. 1, and a lower half of FIG. 2A corresponds to a B-B cross section of FIG. 1. FIG. 2B is an enlarged view of a C part of FIG. 2A.

The pipe unit coupling structure 10 is formed by coupling the fixation member 30, the air cleaner 40, and the resonator 12 in an engine compartment. The fixation member 30 is a plate-shaped member made of a metal or a resin, which is fixed by a bolt (not shown) onto a vehicle body forming member (not shown) which forms a vehicle body.

The fixation member 30 has a flat-surface-shaped, attachment surface unit 31 facing the resonator 12. The fixation member 30 is placed in the engine compartment along a height direction (a direction into or out of the page in FIG. 1). The attachment surface unit 31 faces, for example, a front or a rear of the vehicle. On the attachment surface unit 31, a through hole 32 (FIG. 2B) is formed at an end (an upper end of FIG. 1) in a width direction which is a direction along the attachment surface unit 31 and which is also a direction orthogonal to the height direction. At two positions distanced in the height direction on the other end (a lower end of FIG. 1) in the width direction on the attachment surface unit 31 also, through holes (not shown) are formed. As will be described later, pin-shaped protrusions 27, 28, and 29 of the resonator 12 (FIGS. 3 and 5) are respectively inserted into these three through holes 32 via a grommet 50 (FIG. 2B), to couple the resonator 12 and the fixation member 30.

Figure 3:
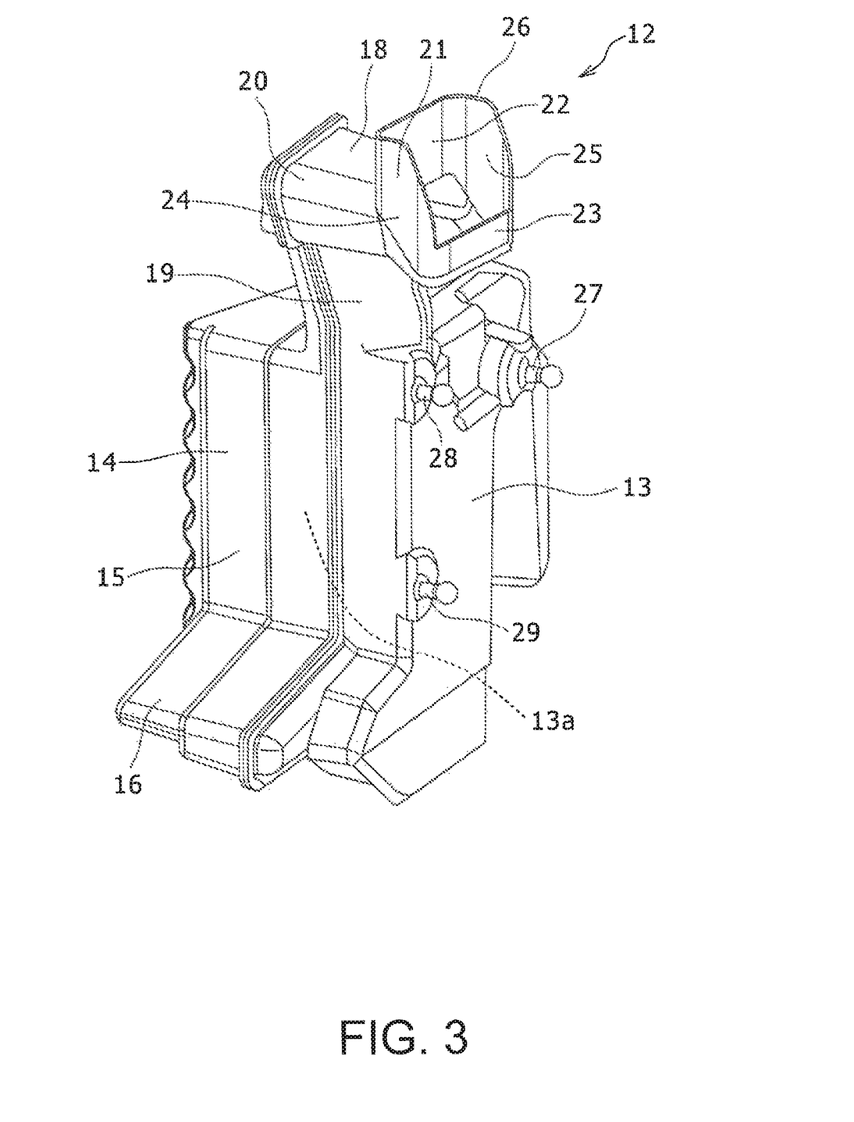
FIG. 3 is a perspective diagram of the second member.
Figure 4:
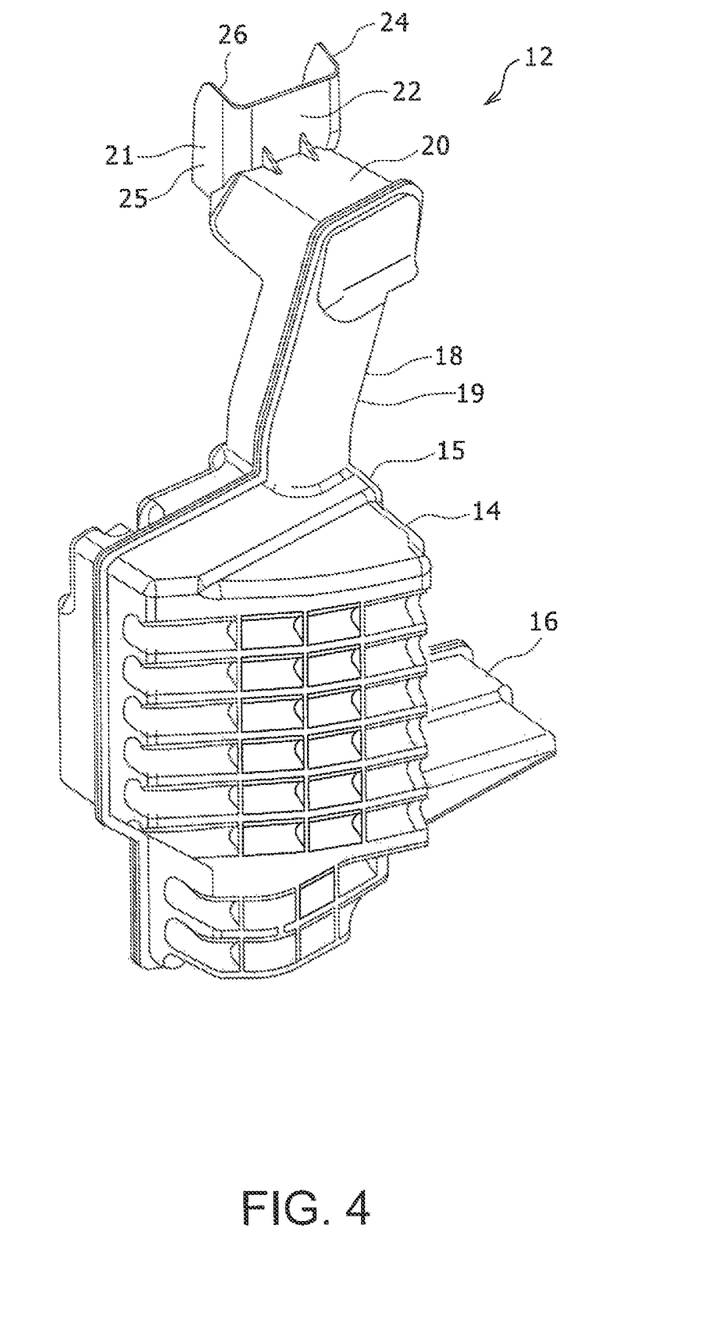
FIG. 4 is a perspective diagram of the second member, viewed in a direction different from FIG. 3.
Figure 5:
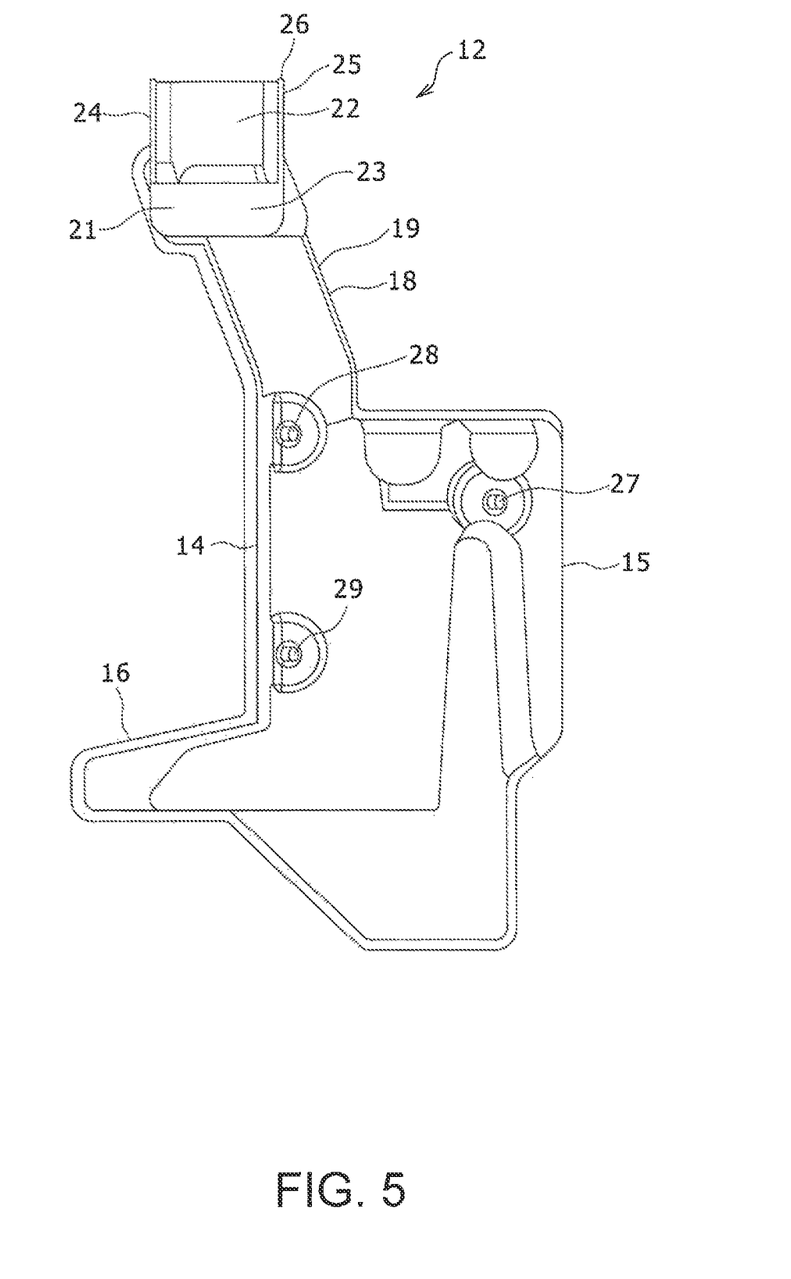
FIG. 5 is a diagram of the second member, viewed in a direction of an arrow D of FIG. 2A.

FIG. 3 is a perspective diagram of the resonator 12. FIG. 4 is a perspective diagram of the resonator 12, viewed in a direction different from that of FIG. 3. FIG. 5 is a diagram showing the resonator 12, viewed in a direction of an arrow D of FIG. 2A.

The resonator 12 is formed by a resin or the like, and comprises a resonator body 13, and the three pin-shaped protrusions 27, 28, and 29. The resonator body 13 comprises a container 14 having a shape in which a protrusion 16 protrudes from a lower side portion of a side surface 15 positioned at one end in a width direction of a box-shaped portion (front side end of the page of FIG. 3, right end of FIG. 4, and left end of FIG. 5), and a pipe unit 18 having an approximate L shape, protruding from an upper end of the container 14. The resonator body 13 has therein a muffling space 13a. The air cleaner 40 (FIGS. 1 and 2) to be described later is connected to an opening end at an upper end of the pipe unit 18.

The three pin-shaped protrusions 27, 28, and 29 protrude on the resonator body 13 in a pin shape from three positions on an outer surface of a side end of the fixation member 30. More specifically, on one surface (right surface of FIGS. 2A and 3, and the front side surface of the page of FIG. 5) in a thickness direction of the resonator body 13, the pin-shaped protrusion 27 is formed at one end in the width direction (back side end of the page of FIG. 3 and a right end of FIG. 5). At the other end in the width direction (front side end of the page of FIG. 3 and a left end of FIG. 5) on one surface in the thickness direction of the resonator body 13, the two pin-shaped protrusions 28 and 29, at an upper side and a lower side, are formed. The two pin-shaped protrusions 27 and 29 protrude from the outer surface of the container 14, and the remaining pin-shaped protrusion 28 protrudes from an outer surface of a continuous portion of the container 14 and the pipe unit 18. The three pin-shaped protrusions 27, 28, and 29 protrude parallel to each other from three portions positioned on approximately the same plane on the outer surface of the resonator body 13. As shown by one pin-shaped protrusion 27 in FIG. 2B, the tip of each of the pin-shaped protrusions 27, 28, and 29 has a spherical shape.

The three pin-shaped protrusions 27, 28, and 29 are respectively inserted into the three through holes 32 formed on the fixation member 30 via the grommet 50 made of an elastomer resin. With reference to FIG. 2B, the pin-shaped protrusion 27 and the through hole 32 will now be described. The grommet 50 is integrally formed, including an inner tube 51 with a bottom, a flange unit 52, and an outer tube 53. The flange unit 52 is formed on an outer circumferential side of an opening end (left end of FIG. 2B) of the inner tube 51, and has a circular disk shape when viewed from one side in the axial direction (left side of FIG. 2B).

The outer tube 53 protrudes in an axial direction from an intermediate portion in a radial direction of the flange unit 52. The outer tube 53 includes a first ring unit 54 to be connected to the flange unit 52, a second ring unit 55 placed at a tip, and a plurality of (for example, 4) pillars (not shown). The plurality of pillars are placed distanced from each other in a circumferential direction at the intermediate portion in the axial direction of the outer tube 53, and connect the first ring unit 54 and the second ring unit 55. An opening 56 is formed between adjacent pillars. A plurality of engagement pieces 57 which extend in the axial direction are formed in a protruding manner at a plurality of positions (for example, four positions) in the circumferential direction at an end of the second ring unit 55 on the side of the flange unit 52, and each engagement piece 57 is placed in the opening 56. On an outer circumferential surface of each engagement piece 57, a first inclined surface 58 and a second inclined surface 59 are formed. The first inclined surface 58 is inclined, in the axial direction of the outer tube 53, in a manner to expand in the outer circumferential side as the position becomes closer to the flange unit 52. The second inclined surface 59 is formed to incline in a direction opposite to the first inclined surface 58 on the end of the first inclined surface 58 on the side of the flange unit 52, and in a steep inclination with respect to the axial direction than the first inclined surface 58.

A recess 51a having a spherical shape is formed on the other end in the axial direction of the inner side surface of the inner tube 51 (right end of FIG. 2B). By the tip of the pin-shaped protrusion 27 being fitted into the recess 51a, the grommet 50 is attached to the pin-shaped protrusion 27. In this state, falling out of the tip of the pin-shaped protrusion 27 from the recess 51a is prevented. The grommet 50 is attached to the pin-shaped protrusion 27, and the tip of the pin-shaped protrusion 27 is inserted into the through hole 32 of the fixation member 30 along with the inner tube 51 and the outer tube 53 of the grommet 50. In this state, the second inclined surface 59 of each engagement piece 57 of the grommet 50 is engaged with a peripheral portion of the opening of the through hole 32 on the fixation member 30. In addition, the flange unit 52 is pressed against a region near the opening of the through hole 32 on the attachment surface unit 31. With regard to the remaining pin-shaped protrusions 28 and 29 of the three pin-shaped protrusions 27, 28, and 29, the pin-shaped protrusions 28 and 29 are similarly inserted into the through holes of the fixation member 30 via the grommet 50, and the grommet 50 is engaged with the fixation member 30. When the fixation member 30 and the resonator 12 are coupled, in a state where the grommet is attached to the peripheral portion of the opening of the fixation member 30, the pin-shaped protrusions 28 and 29 of the resonator 12 are inserted in the axial direction into the inside of the inner tube of the grommet. In this manner, the pin-shaped protrusions 28 and 29 are coupled to the grommet. A coupling unit 60 is formed by the pins-shaped protrusions 27, 28, and 29 being coupled to the grommet 50 attached to the fixation member 30 in a manner described above. The resonator 12 and the fixation member 30 are coupled by the coupling unit 60. Alternatively, the grommet may be made of a rubber.

As shown in FIGS. 2A, and 3~5, the pipe unit 18 comprises a first portion 19 extending from an upper surface of the container 14 in an upwardly slanted direction, a second portion 20 which extends from an upper end of the first portion 19 in an approximate horizontal direction, and a third portion 21 which is connected to a tip of the second portion 20 and which extends approximately upward. An upper end of the third portion 21 is opened. On an upper end surface of an upper end which is a tip of the third portion 21 on the insertion side with respect to the air cleaner 40 (FIGS. 1 and 2A), an inclined surface 26 which is inclined with respect to a horizontal plane is formed. The inclined surface 26 will be described in detail later.

Referring again to FIGS. 1 and 2A, the air cleaner 40 is formed in an approximate box shape by coupling, for example, two case elements, and a filter element (not shown) is placed in the air cleaner 40. An inlet 41 is formed at an end of the air cleaner 40 in an air upstream side (right end of FIG. 1). An end of an air duct 62 (FIG. 1) on an air downstream side is connected to the inlet 41. On an end of the air cleaner 40 on an air downstream side, an intake manifold (not shown) of the engine is attached via a duct (not shown) or the like. The air cleaner 40 is fixed at a lower end or the like to a vehicle body forming member which forms the vehicle body, or a fixation member fixed to the vehicle body forming member.

At an end of the air cleaner 40 on the side of the inlet 41 (right end of FIGS. 1 and 2A), an extension unit 42 which extends toward the side of the resonator 12 is formed at a portion above the inlet 41. A first hole 44 which is opened to a lower side is formed on the extension unit 42. An upper end of the third portion 21 (FIG. 2A) of the resonator 12 is inserted in a fitted state into the first hole 44, so that the air cleaner 40 is coupled to the resonator 12. On the other hand, an operation to insert the third portion 21 into the first hole 44 while properly aligning the members is not easy, and there may be cases where a nearby portion near the first hole 44 on the extension unit 42 is pressed against the upper end surface of the third portion 21. In this case, according to the present embodiment, because the inclined surface 26 is formed on the upper end surface of the third portion 21, separation of the resonator 12 and the fixation member 30 can be suppressed.

Figure 6:
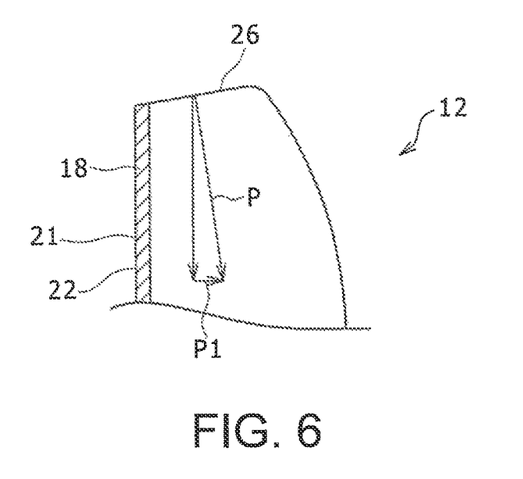
FIG. 6 is an enlarged view of an E part of FIG. 2A, showing the inclined surface of the second member.

FIG. 6 is an enlarged view of an E part of FIG. 2A, showing the inclined surface 26 of the resonator 12. As shown in FIGS. 2A, and 3~6, the third portion 21 has an approximate rectangular tubular shape having a first wall 22 and a second wall 23 which are approximately parallel to each other, and a third wall 24 and a fourth wall 25 which are approximately parallel to each other. The first wall 22 and the second wall 23 are approximately parallel to the attachment surface unit 31 (FIG. 2A) of the fixation member 30, and the third wall 24 and the fourth wall 25 are approximately orthogonal to the attachment surface unit 31. Of the first wall 22 and the second wall 23, an upper end of the first wall 22 at a side nearer to the container 14 in the horizontal direction is higher than an upper end of the second wall 23. Upper ends of the third wall 24 and the fourth wall 25 are gradually inclined in a straight line shape toward an upper side from ends on the side of the first wall 22 toward ends on the side of the second wall 23, and then steeply inclined toward a lower side in an arc shape. The upper end of the first wall 22 and halves of the upper ends of the third wall 24 and the fourth wall 25 on the side of the first wall 22 are positioned on a plane inclined with respect to the horizontal plane. With this configuration, at a tip of the pipe unit 18 on the insertion side with respect to the air cleaner 40, the inclined surface 26 having an approximate U shape when viewed from above is formed. The inclined surface 26 is inclined with respect to the horizontal plane toward the upper side as the position becomes closer to the second wall 23 in the horizontal direction. As described above, in the state where the resonator 12 and the fixation member 30 are coupled to each other, the pipe unit 18 of the resonator 12 is inserted into the first hole 44 of the air cleaner 40. In this process, the air cleaner 40 is assembled with respect to the pipe unit 18, in a downward direction which is a direction of an arrow a in FIG. 2A.

When the inclined surface 26 is pressed against the nearby portion near the first hole 44 of the air cleaner 40, a load is applied from the air cleaner 40 to the inclined surface 26 in a downwardly slanted direction (direction shown by an arrow P in FIGS. 2A and 6) which is a direction orthogonal to the inclined surface 26. The inclined surface 26 is configured such that, at the coupling unit 60 between the resonator 12 and the fixation member 30, a force is applied by the load from the resonator 12, in a direction opposite to the direction of separation of the resonator 12 from the fixation member 30 (a direction of an arrow β in FIG. 2A).

In the pipe unit coupling structure 10 described above, when the pipe unit 18 of the resonator 12 is inserted into the first hole 44 of the air cleaner 40 in a state where the resonator 12 and the fixation member 30 are coupled to each other, there may be cases where a nearby portion of the first hole 44 on the air cleaner 40 is pressed against the inclined surface 26 of the pipe unit 18. In this case, a load is applied from the nearby portion to the pipe unit 18 in the direction shown by the arrow P of FIGS. 2A and 6. In this case, the load has a component force in the direction of protrusion of the pin-shaped protrusions 27, 28, and 29, which is a direction shown by an arrow P1 in FIG. 6, in the horizontal direction. Because of this, based on this load, a force is applied from the resonator 12 to the fixation member 30 at the coupling unit 60, in a direction of the arrow β in FIG. 2A which is a direction opposite to the direction of separation of the resonator 12. Thus, in a structure in which the pipe unit 18 of the resonator 12 is inserted into the first hole 44 and the fixation member 30 is coupled to the resonator 12, the separation of the resonator 12 and the fixation member 30 when the pipe unit 18 is inserted into the first hole 44 can be suppressed.

In addition, when the nearby portion of the first hole 44 of the air cleaner 40 is pressed against the inclined surface 26, the nearby portion slides toward the lower side along the inclined surface 26 in a direction shown by an arrow γ in FIG. 2A. Because of this, it becomes easier for the upper end of the third portion 21 to be inserted into the first hole 44, and, consequently, assembly workability of the resonator 12 and the air cleaner 40 can be improved.

No particular limitation is imposed on the inclination angle of the inclined surface 26 with respect to the horizontal plane, and the inclination angle is suitably determined in consideration of the ease of sliding of the nearby portion of the first hole 44 of the air cleaner 40 and the inclined surface, or the like. For example, the inclination angle of the inclined surface 26 with respect to the horizontal plane is set to 5~12 degrees, and more desirably, at 8~12 degrees. When the inclination angle is increased too much, the amount of material used for the resonator 12 becomes excessively large, and thus, such a configuration is not desirable.

In the embodiment shown in FIG. 2A, the coupling unit 60 between the resonator 12 and the fixation member 30 is placed at a side (left side of FIG. 2A) farther away from the air cleaner 40 in the horizontal direction than the inclined surface 26. The present disclosure, however, is not limited to such a configuration, and the coupling unit may alternatively be placed at a side (right side of FIG. 2A) nearer to the air cleaner 40 in the horizontal direction than the inclined surface 26.

Figure 7:
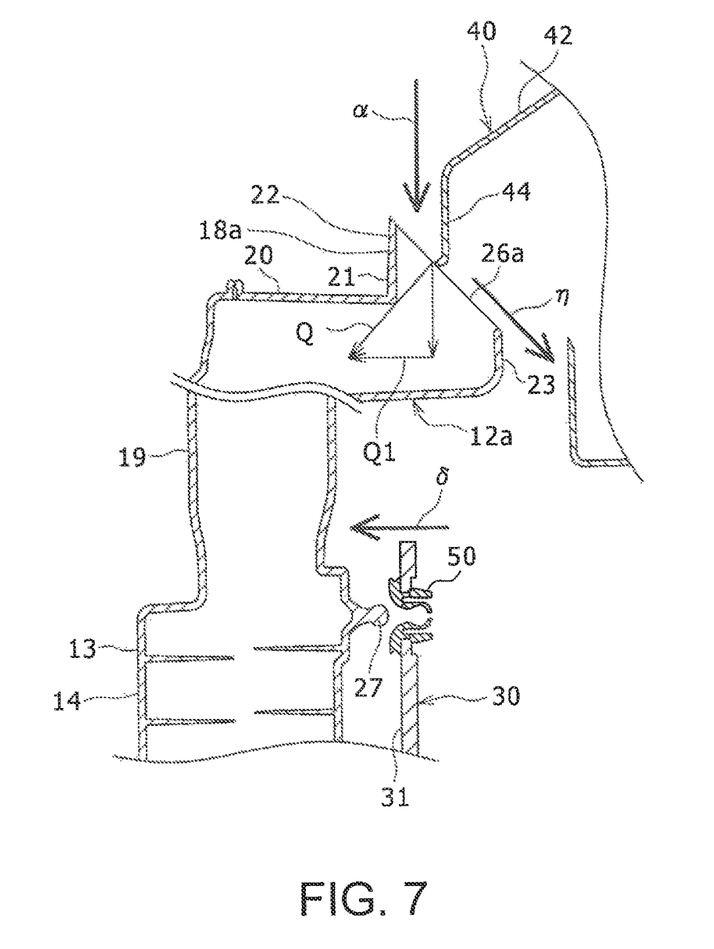
FIG. 7 is a diagram corresponding to FIG. 2A, showing a pipe unit coupling structure of a Comparative Example.

FIG. 7 is a diagram showing a pipe unit coupling structure of a Comparative Example, and corresponding to FIG. 2A. In the Comparative Example shown in FIG. 7, an inclined surface 26a is formed at an upper end surface of a pipe unit 18a of a resonator 12a. The inclined surface 26a is inclined with respect to the horizontal plane toward the lower side as the position becomes closer to the second wall 23 in the horizontal direction. In the Comparative Example, other structures are similar to those of the embodiment shown in FIGS. 1 to 6.

In the Comparative Example also, similar to the above-described embodiment, the resonator 12a and the fixation member 30 are coupled. When the pipe unit 18a of the resonator 12a is inserted into the first hole 44 of the air cleaner 40 in this state, there may be cases where the nearby portion of the first hole 44 on the air cleaner 40 is pressed against the inclined surface 26a of the pipe unit 18a. In the case of the Comparative Example, in this case, a load is applied from the nearby portion to the pipe unit 18a in a direction shown by an arrow Q in FIG. 7. In this case, the load has a component force in a direction opposite to the protrusion direction of the pin-shaped protrusion, which is a direction shown by an arrow Q1 in FIG. 7 in the horizontal direction. Because of this, based on the load, a force is applied from the resonator 12a to the fixation member 30 at the coupling unit with the fixation member 30, in a direction of an arrow δ of FIG. 7, which is a direction of separation of the resonator 12. Thus, as shown in FIG. 7, it becomes easier for the resonator 12a to be separated from the fixation member 30. In addition, in the Comparative Example, when the nearby portion of the first hole 44 on the air cleaner 40 is pressed against the inclined surface 26a, the nearby portion tends to slide toward the lower side, along the inclined surface 26a in a direction of an arrow η of FIG. 7. In this case, because the upper end of the third portion 21 moves away from the first hole 44, the assembly workability of the resonator 12a and the air cleaner 40 is degraded. According to the above-described embodiment, these disadvantages of the Comparative Example can be prevented.

Moreover, in the above-described embodiment, the grommet 50 made of a resin or a rubber is attached to an attachment hole formed on the fixation member 30, and the coupling unit 60 is formed by coupling the pin-shaped protrusion formed on the resonator 12 and the grommet 50. With such a configuration, compared with a structure in which the coupling unit is formed by fastening of a metal bolt and a metal nut, the weight of the coupling unit 60 can be reduced, and the separation of the resonator 12 and the fixation member 30 when the pipe unit 18 is inserted into the first hole 44 can be suppressed.

In the above-described embodiment, a structure is described in which the pin-shaped protrusions 27, 28, and 29 are formed on the resonator 12 and the attachment hole is formed on the fixation member 30. Alternatively, a plate member may be formed on the resonator 12, the attachment hole may be formed on the plate member, a pin-shaped protrusion may be formed on the fixation member 30, and a coupling unit may be formed by the pin-shaped protrusion, the grommet, and the attachment hole.

Furthermore, in the above-described embodiment, the three pin-shaped protrusions and the grommet attached to the attachment hole of the fixation member 30 are coupled to each other, but alternatively, four or more pin-shaped protrusions and the grommet attached to the attachment hole of the fixation member may be coupled to each other.

In addition, in the above description, a case is described in which the fixation member 30 to be coupled to the resonator 12 is a member fixed to the vehicle body forming member, but alternatively, the vehicle forming member placed in the engine compartment may be set as the fixation member, and the resonator 12 may be attached to the fixation member.

Moreover, in the above description, a case is described in which the first member is the air cleaner 40, the second member is the resonator 12, and the third member is the fixation member 30. The first member, the second member, and the third member are not limited to these, and members other than those described in the above-described embodiment may be used, so long as these members are within the scope of the present disclosure.

The invention claimed is:
1. A pipe unit coupling structure comprising:
   a first member in which a first hole that is opened to a lower side is formed;
   a second member including a pipe unit which is coupled to the first member by being inserted into the first hole; and
   a third member coupled to the second member by a coupling unit, wherein
   the second member has an inclined surface formed on an upper end surface of a tip of the pipe unit on an insertion side and positioned on a plane inclined with respect to a horizontal plane,
   the coupling unit is positioned at a lower side of the pipe unit, and is configured such that a direction of separation is in a horizontal direction, and
   the inclined surface is configured in such a manner that, when the inclined surface is pressed against the first member from an upper side when the pipe unit of the second member is inserted into the first hole of the first member from the lower side by the first member being assembled in a downward direction with respect to the pipe unit of the second member in a state where the second member and the third member are coupled to each other, a force is applied from the second member to the third member at the coupling unit, in a direction opposite to a direction of separation of the second member, by a component force in the horizontal direction, of a load applied from the first member to the inclined surface.

2. The pipe unit coupling structure according to claim 1, wherein a grommet made of a resin or a rubber is attached to an attachment hole formed on one of the second member and the third member, and the coupling unit is formed by coupling a pin-shaped protrusion formed on the other of the second member and the third member, and the grommet.

* * * * *